US008668211B2

(12) United States Patent  
King (10) Patent No.: US 8,668,211 B2  
(45) Date of Patent: Mar. 11, 2014

(54) HIGH STRENGTH PLASTIC FURNITURE DOLLY

(76) Inventor: David L. King, Arlington Heights, IL (US)

( * ) Notice: Subject to any disclaimer, the term of this patent is extended or adjusted under 35 U.S.C. 154(b) by 399 days.

(21) Appl. No.: 13/062,337

(22) PCT Filed: Aug. 28, 2009

(86) PCT No.: PCT/US2009/055374
§ 371 (c)(1),
(2), (4) Date: Mar. 4, 2011

(87) PCT Pub. No.: WO2010/027919
PCT Pub. Date: Mar. 11, 2010

(65) Prior Publication Data
US 2011/0156367 A1 Jun. 30, 2011

Related U.S. Application Data

(60) Provisional application No. 61/191,080, filed on Sep. 5, 2008.

(51) Int. Cl.
*B62B 5/00* (2006.01)
(52) U.S. Cl.
CPC .................... *B62B 5/0083* (2013.01)
USPC ........................ 280/79.2; 280/79.11
(58) Field of Classification Search
CPC ................. B62B 3/10; B62B 5/0083
USPC .............................. 280/79.11, 79.7
See application file for complete search history.

(56) References Cited

U.S. PATENT DOCUMENTS

| 1,999,172 | A | | 4/1935 | De Boer |
|---|---|---|---|---|
| 4,127,202 | A | * | 11/1978 | Jennings et al. ............... 414/537 |
| 4,166,638 | A | | 9/1979 | De Prado |
| 4,178,006 | A | | 12/1979 | Johnson |
| 4,268,332 | A | * | 5/1981 | Winders ......................... 156/160 |
| 4,720,115 | A | * | 1/1988 | Rehrig ......................... 280/79.11 |
| 4,822,066 | A | * | 4/1989 | Rehrig ......................... 280/79.11 |
| 4,824,129 | A | * | 4/1989 | Rehrig ......................... 280/79.11 |
| 5,163,695 | A | | 11/1992 | Pakowsky |
| 5,253,887 | A | | 10/1993 | Marenger |
| 5,921,566 | A | * | 7/1999 | Kern et al. ................... 280/79.11 |
| 6,550,794 | B1 | * | 4/2003 | Spindel et al. ............. 280/79.11 |
| 6,974,140 | B2 | * | 12/2005 | Neuman .................... 280/79.11 |
| 7,036,833 | B1 | * | 5/2006 | Berna et al. ................ 280/79.11 |
| 2004/0050742 | A1 | * | 3/2004 | Gruber ........................... 206/509 |
| 2004/0220325 | A1 | * | 11/2004 | Kitano et al. ................. 524/543 |
| 2008/0100015 | A1 | * | 5/2008 | Symiczek ..................... 280/79.4 |

FOREIGN PATENT DOCUMENTS

| CA | 1305982 | 5/1988 |
|---|---|---|
| FR | 1485314 | 5/1967 |
| GB | 2 171 064 A | 8/1986 |

* cited by examiner

*Primary Examiner* — Hau Phan
*Assistant Examiner* — Jacob Meyer
(74) *Attorney, Agent, or Firm* — Pauley Peterson & Erickson (57) ABSTRACT

A high strength plastic furniture dolly employs a combination of structural features and high strength material to eliminate the need for metal or wood reinforcing elements. The dolly includes first and second longitudinal side members, first and second transverse end members, and caster wheel assemblies mounted longitudinally inward from the transverse end members. The longitudinal side members include a plurality of longitudinally extending parabolic ribs in a central portion and a plurality of non-parabolic ribs in end portions of each side member. The transverse end members include a plurality of transversely extending ribs which may be parabolic.

20 Claims, 11 Drawing Sheets

HIGH STRENGTH PLASTIC FURNITURE DOLLY

FIELD OF INVENTION

This invention is directed to a modular lightweight disposable plastic furniture dolly that can withstand loads caused by the transportation of heavy furniture.

BACKGROUND OF THE INVENTION

Furniture dollies used in the moving industry are conventionally constructed of heavy wood and metal components. While such dollies are durable, they are relatively expensive and heavy. If a conventional dolly breaks or wears out, it must typically be replaced in its entirety. The dolly components are generally not modular, and cannot be recycled.

Because of the need to reduce costs and preserve the environment, there is an incentive to make dollies from materials that cost less and can be recycled. There is also an incentive to make dollies that are modular, so that individual parts can be replaced. To date, such attempts have been generally unsuccessful because the low cost recyclable components have not been strong enough to support heavy furniture loads.

U.S. Pat. No. 4,822,066 issued to Rehrig, discloses a plastic dolly that is strengthened by longitudinal metal reinforcing bars inserted in the longitudinal side members. Another plastic dolly reinforced with longitudinal metal bars is disclosed in U.S. Pat. No. 4,720,115 to Rehrig. Other plastic dollies are disclosed in U.S. Pat. No. 4,824,129, issued to Rehrig; U.S. Pat. No. 5,921,566, issued to Kern et al.; and U.S. Pat. No. 7,036,833, issued to Berna et al. When designed without metal reinforcing members, the prior art dollies are generally not strong enough to carry heavy furniture.

SUMMARY OF THE INVENTION

The present invention is directed to a plastic dolly that is strong enough to carry heavy furniture yet is devoid of metal support members. The dolly has a lightweight, inexpensive construction and is formed of modular components that can be individually replaced and recycled.

The dolly of the invention includes two longitudinal side members and two transverse end members coupled together to form a rectangular frame. The longitudinal side members and transverse end members are formed of plastic and do not require reinforcement by metal, wood, or any other non-plastic material. The longitudinal side members and transverse end members are modular, and can be individually replaced and recycled.

Each longitudinal side member of the dolly includes a center portion, first and second end portions, an upper facing and a lower facing. The center portion of each longitudinal side member includes, on its lower facing, a plurality of longitudinal ribs that extend longitudinally from the first end portion to the second end portion. The longitudinal ribs protrude downward from the lower facing of the side member and have a parabolic profile such that the ribs have a greater depth in between the two end portions than in the vicinity of the two end portions. Each longitudinal side member should have at least two of the parabolic longitudinally extending ribs in its center portion, suitably four or more.

Each end portion of each longitudinal side member includes a plurality of longitudinally extending ribs protruding downward from the lower facing of the side member. The longitudinally extending ribs in the end portions are non-parabolic. Some of the longitudinally extending ribs in the end portions may be contiguous with the parabolic ribs in the center portion. Some of them may not be contiguous if the number of non-parabolic longitudinally extending ribs in each end portion exceeds the number of parabolic ribs in the center portion. Each side member should have at least two of the non-parabolic longitudinally extending ribs in each of its end portions, suitably four or more.

The center portion of each longitudinal side member also includes, on its lower facing, a plurality of transversely or diagonally extending ribs that intersects with the parabolic longitudinally extending ribs. The transversely or diagonally extending ribs in the center portion may be longitudinally spaced apart at the same or varying distances to reflect the likely distribution of load. The transversely or diagonally extending ribs may also have varying depths that correspond to the depths of the parabolic longitudinally extending ribs at the points of intersection. Each longitudinal side member should have at least two of the transversely or diagonally extending ribs in its center portion.

Each end portion of each longitudinal side member includes, on its lower facing, at least one transversely extending rib that intersects with the longitudinally extending ribs in the end portion. The transversely extending rib can have a depth that corresponds to the depth of the non-parabolic longitudinally extending ribs in the end portion.

Each transverse end member of the dolly includes an upper facing and a lower facing. The lower facing of each end member includes a plurality of transversely extending ribs that extend in the transverse direction of the dolly (along the length of the end member) and one or more longitudinally or diagonally extending ribs that extend in the longitudinal direction of the dolly (along the width of each end member) and intersect the transversely extending ribs. The transversely extending ribs and longitudinally extending ribs protrude downward from the lower facing of each transverse end member. Each end member should have at least two of the transversely extending ribs, suitably four or more, and at least one of the longitudinally extending ribs.

Each transverse end member may also have a rubber cap affixed to its upper facing. The rubber caps prevent sliding of the furniture being carried on the dolly. The dolly also includes four wheel assemblies mounted to the longitudinal side members for rolling the dolly.

With the foregoing in mind, it is a feature and advantage of the invention to provide a high strength plastic furniture dolly whose longitudinal side members and transverse end members can be made entirely of plastic, and have structural features that enable the transportation of heavy furniture without the use of metal reinforcing members.

It is also a feature and advantage of the invention to provide a high strength plastic furniture dolly whose longitudinal side members and transverse end members can be formed of lightweight, recyclable, inexpensive plastic materials, and can be individually replaced without replacing the entire dolly.

DETAILED DESCRIPTION OF THE PRESENTLY PREFERRED EMBODIMENTS

Figure 1:
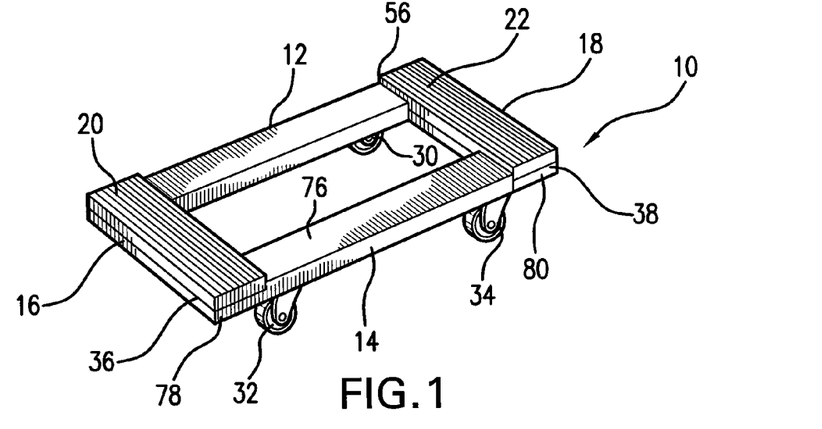
FIG. 1 is a top perspective view of the high strength plastic furniture dolly of the invention.
Figure 2:
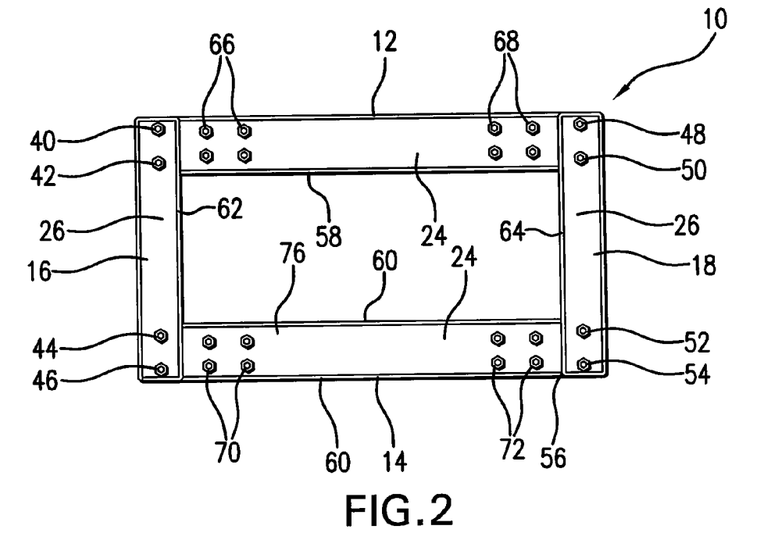
FIG. 2 is a top plan view of the dolly and illustrates the longitudinal side members and transverse end members without the rubber end caps.

Referring to FIGS. 1 and 2, a dolly 10 of the invention is shown having two longitudinal side members 12 and 14, two transverse end members 16 and 18, end caps 20 and 22 affixed to upper facing 26 of the transverse end members, and four caster wheel assemblies 28, 30, 32 and 34. The longitudinal side members 12 and 14 are joined to the transverse end members 16 and 18 using lap joints 36 and 38, and are affixed to each other using fasteners 40, 42, 44, 46, 48, 50, 52 and 54 which can be screws, bolts or pins. Alternatively or additionally, the longitudinal side members 12 and 14 can be joined to the transverse end members 16 and 18 using interlocking male and female protrusions or tongue and mortise joints. The male protrusions can be in either the longitudinal side members 12 and 14 or the transverse end members 16 and 18, and the mating female protrusions can be in the other of the longitudinal side members 12 and 14 and transverse end members 16 and 18. The longitudinal side members 12 and 14 and transverse end members 16 and 18 are thus joined to form a rectangular frame 56 for the dolly 10.

The longitudinal side members 12 and 14 and transverse end members 16 and 18 can be constructed entirely of a high strength plastic material and have a uniform composition that is devoid of reinforcing elements. Examples of suitable plastic materials include without limitation high density polyethylene, polypropylene, polyesters, polyamides and polycarbonates. Polypropylene is particularly suitable for injection molding because it achieves a balance of high strength and relatively low cost, and is relatively easy to mold. The polypropylene should have a melt flow rate (measured at 230° C.) of less than about 2.5 grams/10 minutes, suitably less than about 1.5 grams/10 minutes, or less than about 1.0 grams/10 minutes, determined using ASTM D1238. Polypropylenes having relatively low melt flow rates typically have higher number average molecular weights and exhibit greater strength. Single-site catalyzed polypropylenes typically have greater strength than Ziegler-Natta catalyzed polypropylenes of comparable molecular weight, but are more expensive. Particularly suitable resins for making compression-molded parts include fiberglass-reinforced polypropylene composites and fiberglass-reinforced epoxy resin composites.

Fiberglass-reinforced polypropylene composites are particularly suitable because they facilitate the manufacture of strong injection molded parts having minimal thickness and weight while providing a completely recyclable composition. Suitable composites may include about 5-50% by weight fiberglass and about 50-95% by weight polypropylene, or about 10-30% by weight fiberglass and about 70-90% by weight polypropylene. One suitable composite includes about 15-25% by weight fiberglass long fibers, about 1-10% by weight high density polyethylene and about 65-84% by weight polypropylene homopolymer, with a trace amount of ultraviolet stabilizer. By forming the dolly 10 of recyclable materials and lightweight parts and by making the dolly modular, so that only worn or damaged parts need to be replaced, the impact on the environment can be minimized while minimizing the cost to the user.

In order to facilitate molding, ease of use and reduced wear and tear, the longitudinal side members 12 and 14 and transverse end members 16 and 18 can have beveled or rounded edges 58, 60, 62 and 64. The caster wheel assemblies 28, 30, 32 and 34 may be of conventional construction and can be mounted to caster bosses 33 shown in FIG. 3. However, as shown in FIG. 2, the caster wheel assemblies are mounted beneath the longitudinal side members 12 and 14 at positions longitudinally inward from the transverse end members 16 and 18 using fasteners 66, 68, 70 and 72. This provides for a more stable distribution of the load when the dolly 10 is used to carry heavy furniture, by positioning the caster wheels directly underneath or very close to the load-producing furniture. This also maximizes the effective load-bearing capacity of the dolly 10. The fasteners 66, 68, 70 and 72 can be screws, bolts or pins effective to firmly secure the caster wheel assemblies to the longitudinal side members 12 and 14 of the dolly 10.

The end caps 20 and 22 are intended to prevent slippage of furniture and other items carried by the dolly. The end caps 20 and 22 may have a serrated texture as shown in FIG. 1, and may be secured to the upper facings 26 of the transverse end members 16 and 18 using adhesives, fasteners or other suitable techniques. The end caps 20 and 22 can be made of rubber or another suitable material that provides a high friction interface with the furniture being moved.

Figure 3:
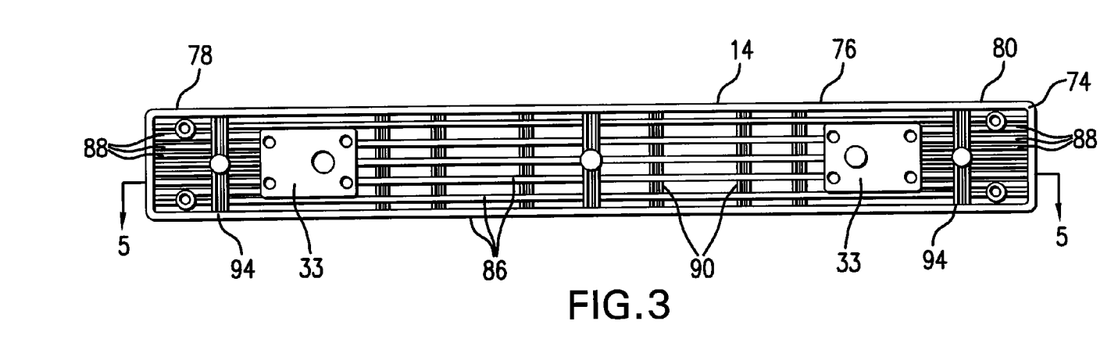
FIG. 3 is a bottom view of a longitudinal side member of the dolly.

The longitudinal side members 12 and 14 can each have an upper facing 24 as shown in FIG. 2 and a lower facing 74 as shown in FIG. 3. As shown in FIGS. 1-5, each longitudinal side member includes a center portion 76, and first and second end portions 78 and 80. The center portion 76 of each longitudinal side member extends longitudinally between the depressions 82 and 84 that help form the lap joints 36 and 38, and does not include the depressions. The first end portion 78 is longitudinally extends along the depression 82. The second end portion 80 longitudinally extends along the depression 84.

Figure 4:
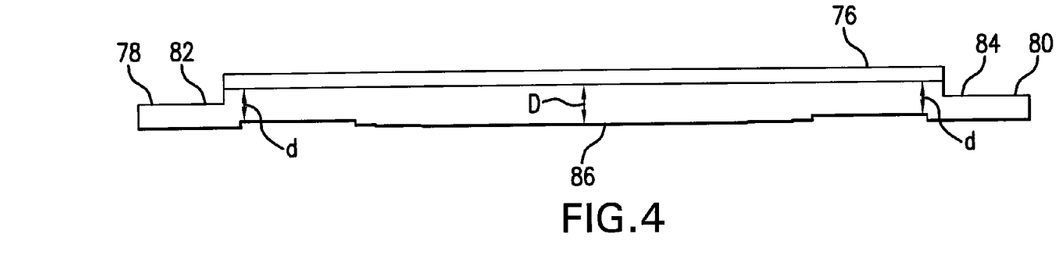
FIG. 4 is a side view of the longitudinal side member of FIG. 3.
Figure 5:
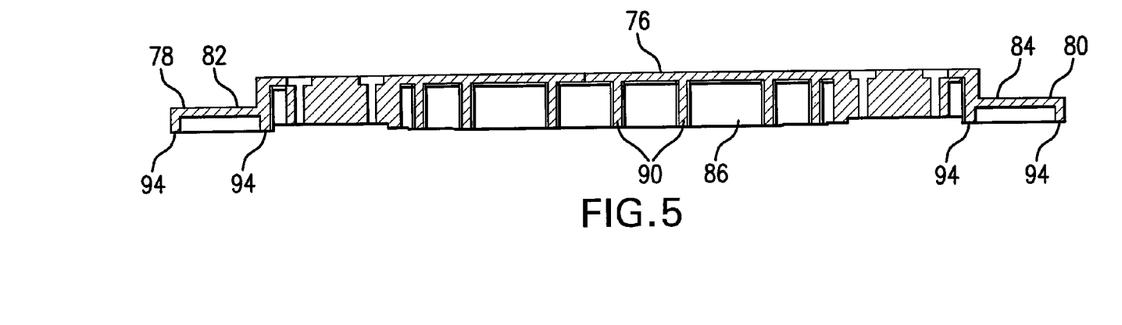
FIG. 5 is a sectional view of the longitudinal side member taken along line 5-5 in FIG. 3.

The center portion 76 of each longitudinal side member includes, on its lower facing 74, a plurality of longitudinal ribs 86 that extend longitudinally from the first end portion 78 to the second end portion 80. The longitudinal ribs 86 protrude downward from the lower facing 74 of the side member and have a parabolic profile as shown in FIGS. 4 and 5. Due to the parabolic profile, the ribs 86 have a greater depth in between and substantially inward from the two end portions, than in the vicinity of the end portions. As shown in FIG. 5, for instance, the depth D of the rib 86 about halfway in between the end portions 78 and 80 is greater than the depths d in the vicinity of each end portion.

As shown in FIGS. 3-5, the parabolic depth of the longitudinal ribs in the center portion increases at locations furthest away from the mounting plates 33 for the caster wheel assemblies. Thus, the structural strength of the longitudinal side members 12 and 14 is maximized at the locations that receive the least support from the caster wheel assemblies. Referring FIG. 4, the maximum depth D of the longitudinal ribs 86 near the center of the parabola should be at least 10% greater, suitably at least 20% greater, than the minimum depths d of the ribs where the longitudinal side members 12 and 14 are affixed to the caster wheel assemblies, just inward from end portions 78 and 80. Moreover, in order to provide high structural integrity to the side members 12 and 14, the center portion 76 of each side member should include at least two of the longitudinally extending ribs 86, suitably at least three of the ribs, or at least five of the ribs, or at least seven of the ribs 86. The embodiment shown in FIG. 3 illustrates seven of the longitudinally extending ribs 86. Alternative embodiments of longitudinal side members 12 and 14 shown in FIGS. 7 and 8 have eight of the ribs 86.

Figure 7:
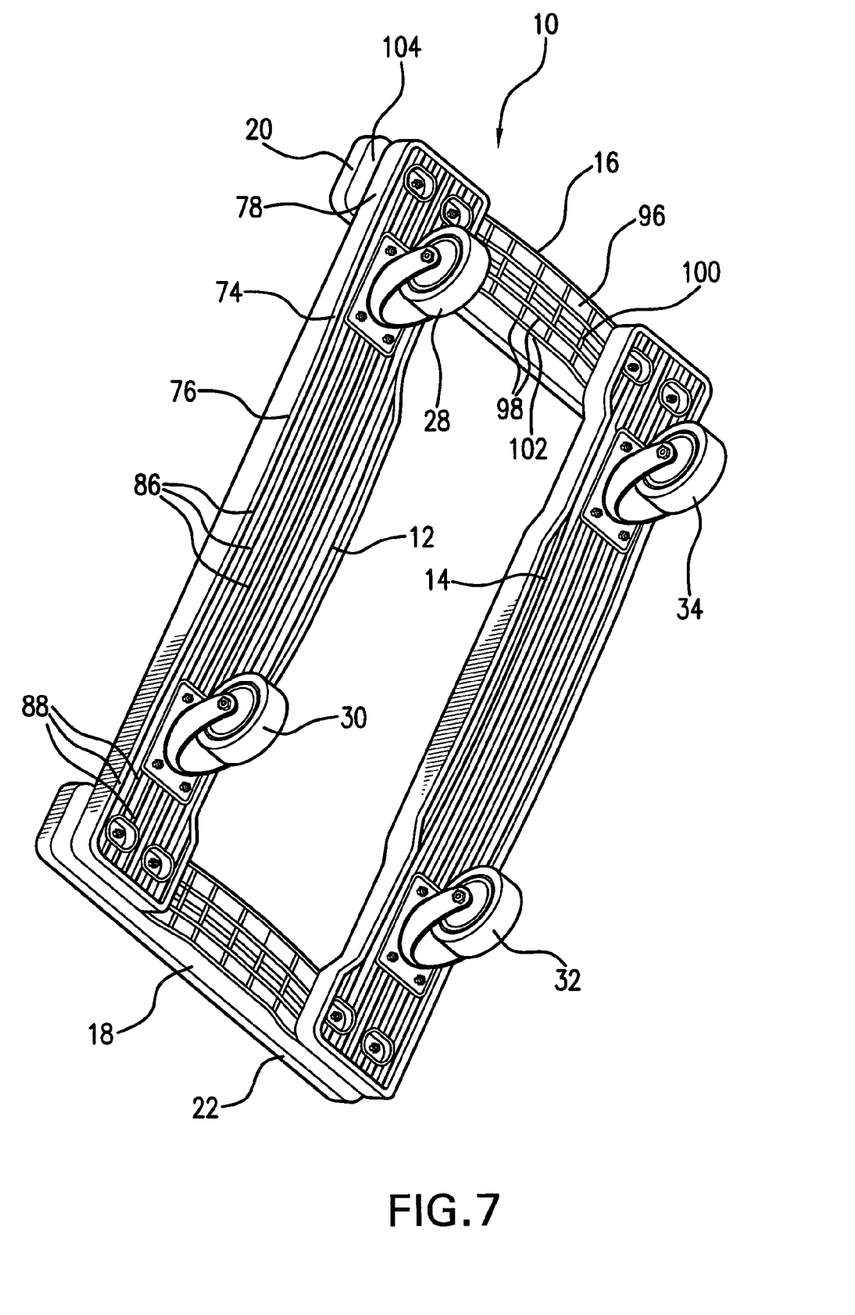
FIG. 7 is a bottom perspective view of an alternative embodiment of the high strength plastic furniture dolly of the invention.
Figure 8:
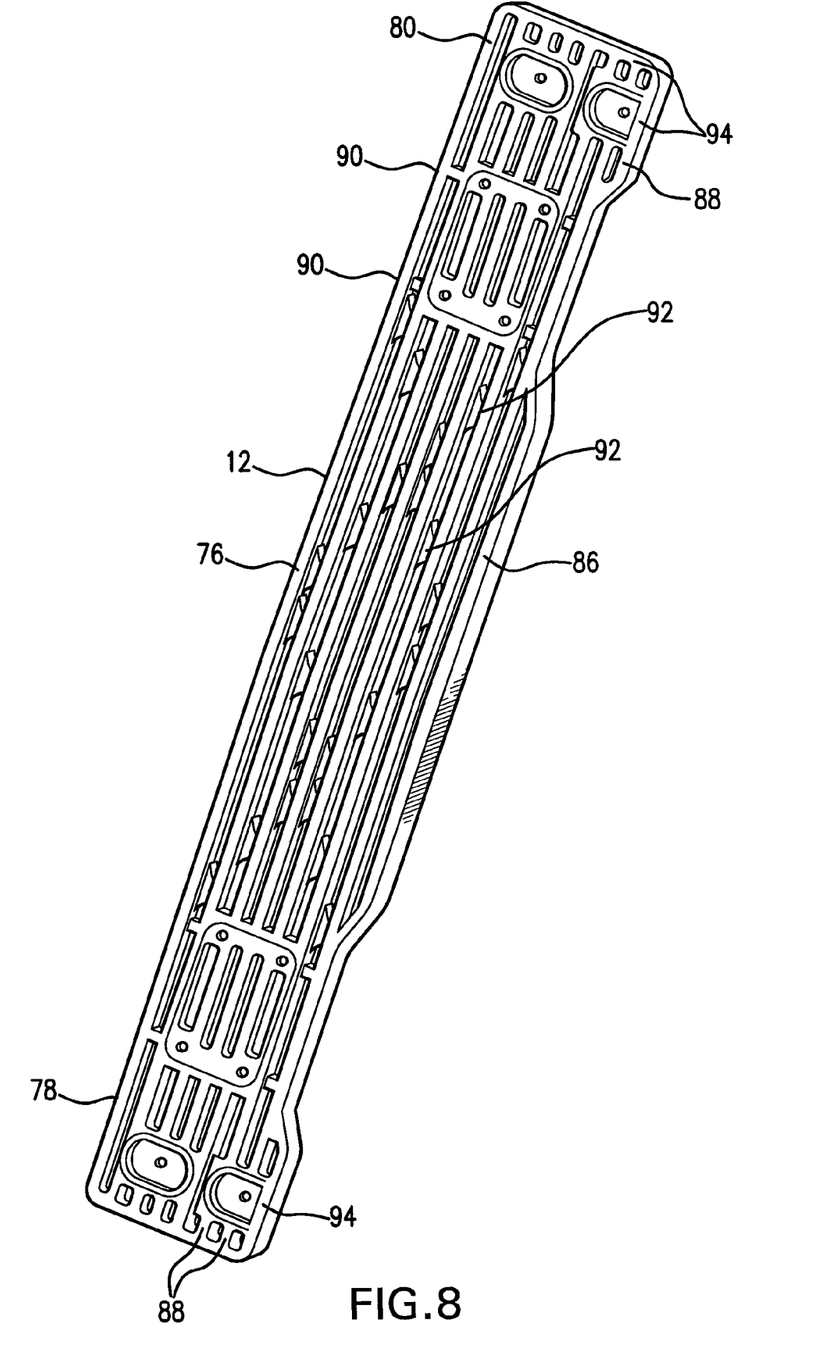
FIG. 8 is a bottom perspective view of a longitudinal side member that can be substituted in the high strength furniture dolly of FIG. 7.

As shown in FIGS. 3 and 7, each end portion 78 and 80 of each longitudinal side member 12 and 14 includes a plurality of longitudinally extending ribs 88 protruding downward from the lower facing 74 of the side member. The longitudinally extending ribs 88 in the end portions 78 and 80 are suitably non-parabolic. Some of the longitudinally extending ribs 88 in the end portions 78 and 80 may be contiguous with the parabolic ribs 86 in the center portion. Some of the ribs 88 may not be contiguous with the ribs 86 if the number of ribs 88 in each end portion exceeds the number of ribs 86 in the center portion. In the embodiment shown in FIG. 3, eleven ribs 88 are present in each end portion and seven of them are contiguous with the parabolic ribs 86 in the center portion. In the embodiment shown in FIG. 7, seven of the eight ribs 88 in end portions 78 and 80 are contiguous with seven of the eight ribs 86 in center portion 76. In order to provide high structural integrity to the lap joints 36 and 38 of the dolly 10, the end portions 78 and 80 of side members 12 and 14 should each include at least two longitudinally extending ribs 88, suitably at least three of the ribs, or at least five of the ribs, or at least seven of the ribs 88.

The center portion 76 of each longitudinal side member 12 and 14 also includes, on its lower facing 74, a plurality of transversely extending ribs 90 and/or diagonally extending ribs 92 that intersect with the longitudinally extending ribs 86. The transversely or diagonally extending ribs may be placed in locations to reflect the likely distribution of the load. In the embodiment of FIGS. 3-5, the transversely extending ribs 90 are spaced more closely together where the depths d of the parabolic ribs 86 are the least, and further apart where the depths D of the parabolic ribs 86 are the greatest. The embodiment of FIG. 8 has transversely extending ribs only near the ends of the ribs 86 and has a plurality of criss-crossing diagonally extending ribs 92 near the center of the parabolic ribs 86. Each longitudinal side member 12 and 14 should have at least two longitudinally and/or diagonally extending ribs 90 and 92, suitably at least three of the ribs, or at least five of the ribs, in its center portion 76. The side member 12 of FIG. 3 has seven transversely extending ribs 90 in center portion 76. The side member 12 of FIG. 8 has four transversely extending ribs 90 and four diagonally extending ribs 92 in its center portion 76.

Each end portion 78 and 80 of longitudinal side members 12 and 14 may include, on the lower facing 76, at least one transversely extending rib 94 that intersects with the longitudinally extending ribs 88 in the end portion. The side members 12 shown in FIGS. 3 and 8 each have two transversely extending ribs 94 in each end portion 78 and 80.

Figure 6:
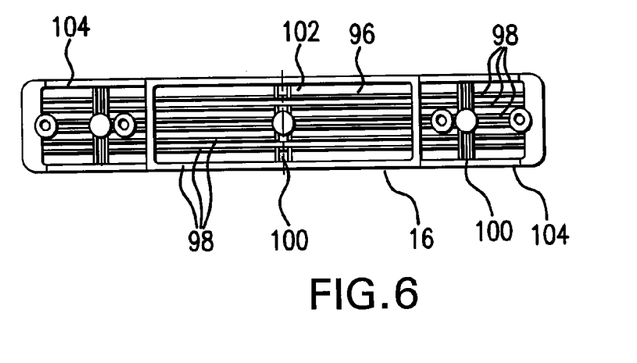
FIG. 6 is a bottom view of a transverse end member of the dolly.

Referring to FIGS. 2, 6 and 7, each transverse end member 16 and 18 of dolly 10 includes an upper facing 26 and a lower facing 96. The lower facing 96 includes a plurality of transversely extending ribs 98 that extend in the transverse direction of dolly 10, (along the length of the transverse end member) and one or more longitudinally extending ribs 100 that intersect the transversely extending ribs 98 and extend along the width of the transverse end member. The transversely extending ribs 98 protrude downward from the lower facing 96 and can have a parabolic profile as shown in FIGS. 6 and 7, which causes the ribs 98 to have a greater depth in their center regions 102 than in their end regions 104. Each transverse end member 16 and 18 should include at least two of the transversely extending ribs 98, suitably at least three of the ribs, or at least five of the ribs, or at least seven of the ribs. The transverse end member 16 shown in FIG. 6 includes eight transversely extending ribs 98. The transverse end members 16 and 18 shown in FIG. 7 include four transversely extending ribs 98.

The longitudinally extending ribs 100 may extend straight in the longitudinal direction as shown in FIGS. 6 and 7, or may extend at an angle. Each transverse end member 16 and 18 should include at least one of the longitudinally extending ribs 100, suitably at least three, or at least five. The transverse end member 16 of FIG. 6 has three of the longitudinally extending ribs 100. The transverse end members 16 and 18 shown in FIG. 7 each have ten of the longitudinally extending ribs 100, five of which are hidden from view.

As shown in FIGS. 1 and 7, the transverse end members 16 and 18 may include end caps 20 and 22 affixed to their upper facings 26. End caps 20 and 22 may be formed of rubber, soft plastic, coarse carpeting or another friction-bearing material, and may be affixed to surfaces 26 using fasteners or other suitable techniques. Alternatively, end caps 20 and 22 can be designed to mate with upper surfaces 26 so that no fastener is required. In an alternative embodiment (not shown), a similar cover material can be affixed to the upper surfaces 24 of longitudinal side members 12 and 14.

Figure 9A:
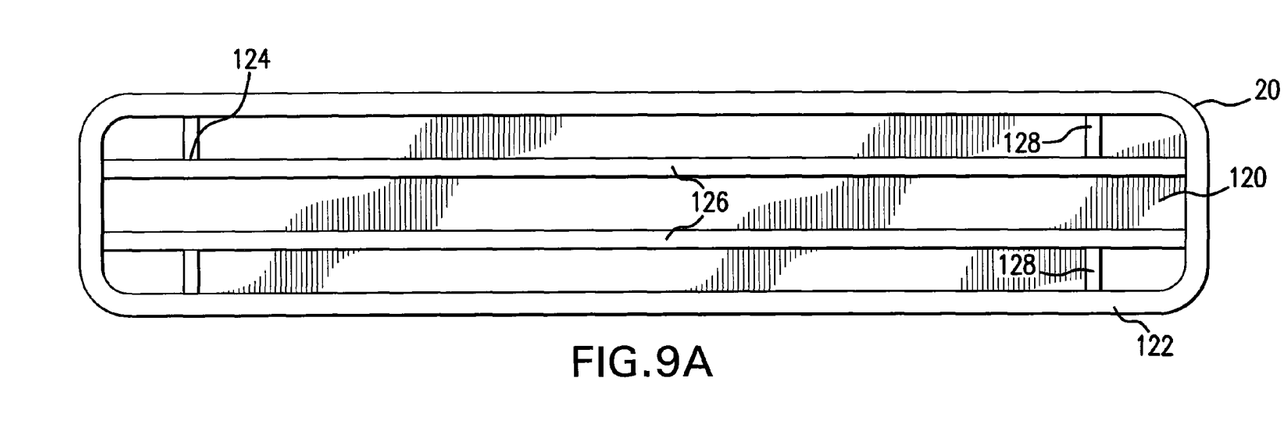
FIG. 9A is a bottom view of an end cap for positioning on a transverse end member of the dolly of the invention.

FIG. 9A is a bottom view of an end cap 20 (or 22) that is designed to mate with upper facings 26 of transverse end members 16 and 18 so that no adhesive is needed. The bottom surface 120 of end cap 20 is equipped with a retaining protrusion 122 that is continuous around its outer periphery. An interlock grid 124 formed of cross members 126 and 128 engages and reinforces the retaining protrusion 122. During use of the end cap, the retaining protrusion 122 snaps around the respective upper facing 26 of transverse end member 16 or 18 and interlocks the facing 26 with the aid of interlock grid 124 to secure the end cap 20 (or 22) to the transverse end member 16 or 18.

Figure 9B:
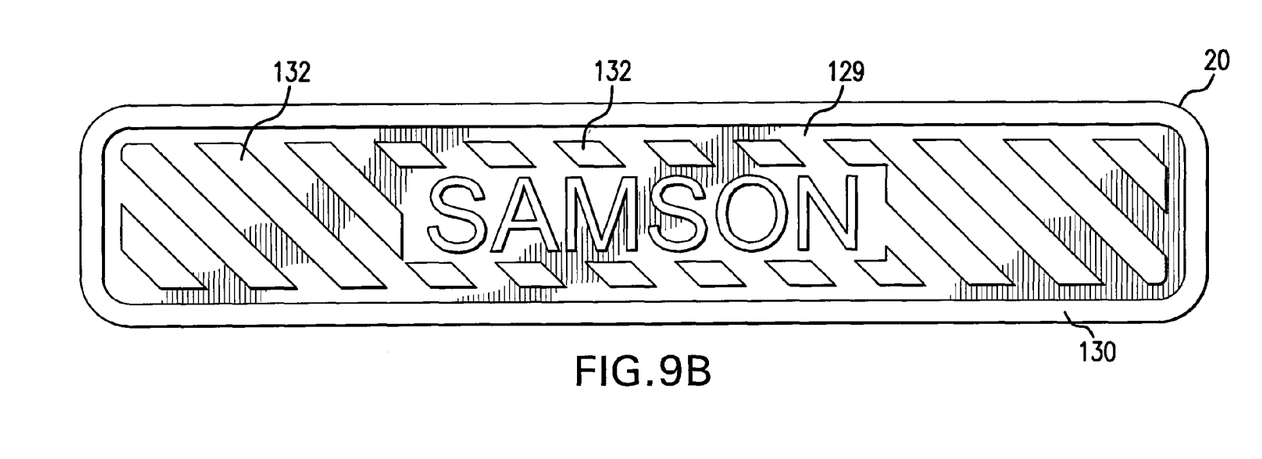
FIG. 9B is a top view of the end cap of FIG. 9A.

FIG. 9B is a top view of the same end cap 20 (or 22) illustrated in FIG. 9A. The upper surface 129 of end cap 20 includes a continuous protrusion 130 around its outer periphery and serrated protrusions 132 throughout the interior portion of the upper surface 129. The continuous protrusion 130 and serrated protrusions 132 help the end cap 20 (or 22) maintain a firm frictional grip on objects being carried by the dolly 10.

Figure 10:
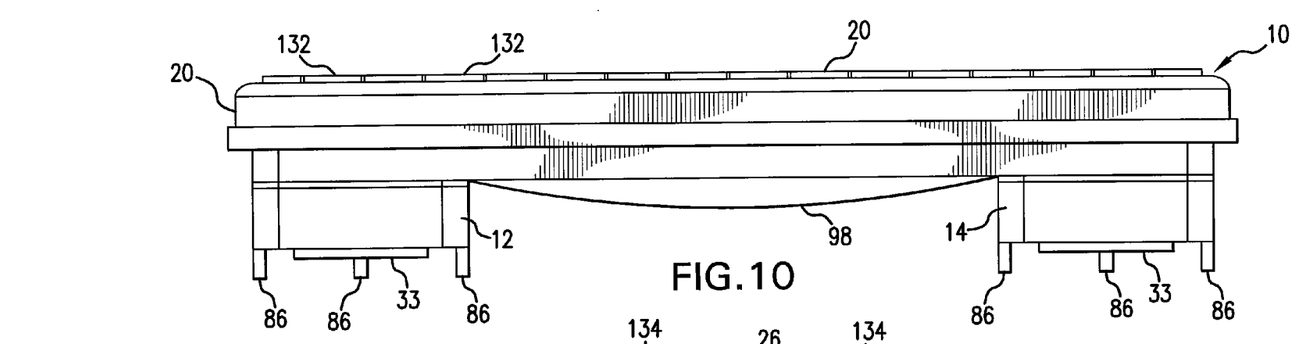
FIG. 10 is an end view of another embodiment of the high strength plastic furniture dolly of the invention.
Figure 11:
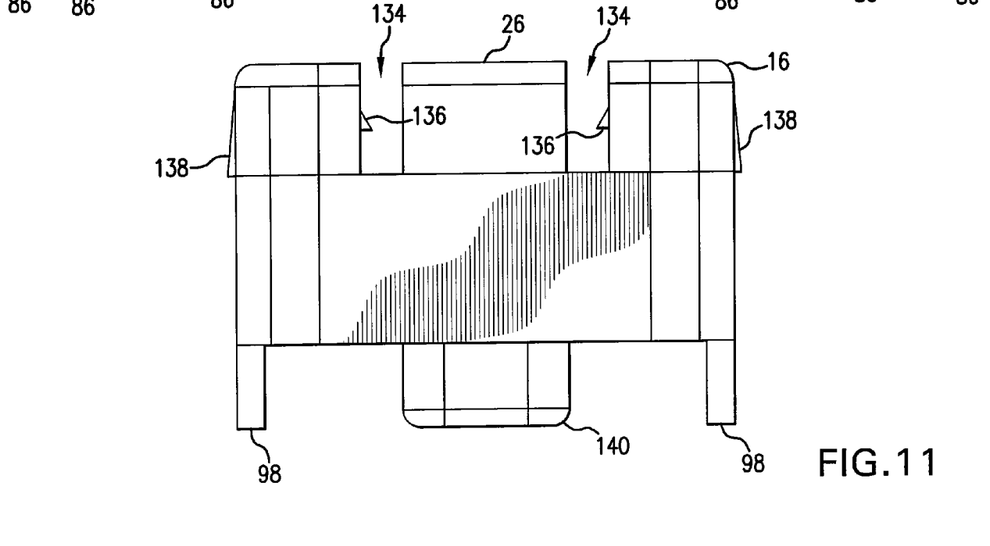
FIGS. 11, 12, and 13 are end, top and bottom views, respectively, of a transverse end member useful in the dolly of FIG. 10.
Figure 12:
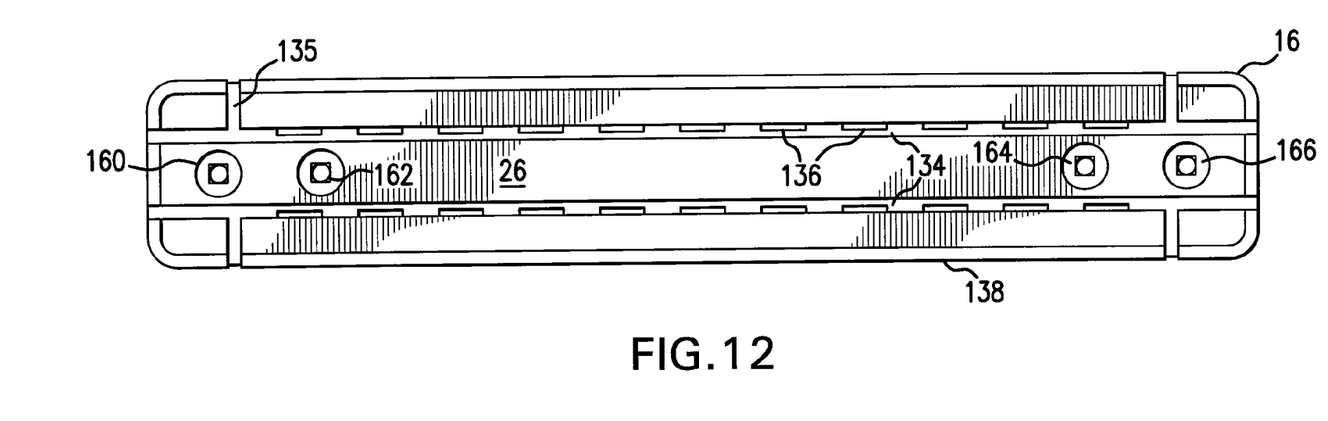
Figure 13:
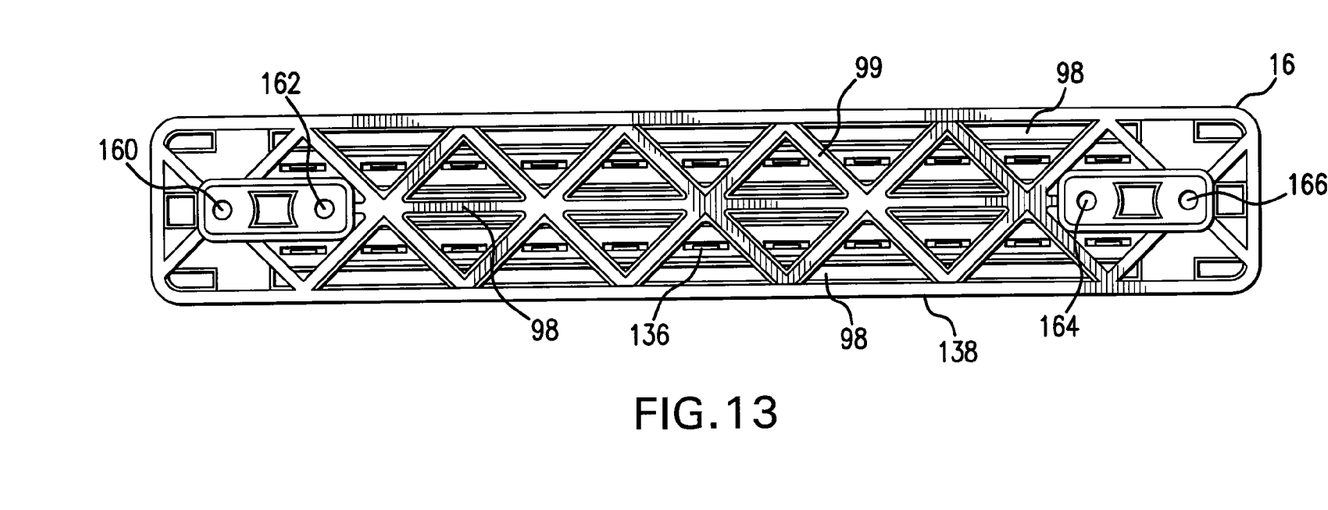

FIG. 10 is an end view of one embodiment of the dolly 10 that uses a specific design of transverse end members 16 and 18 (shown in FIGS. 11-13) and alternative designs of longitudinal side members described below, to facilitate high strength, versatility and modularity. FIGS. 11, 12 and 13 are end, top and bottom views, respectively of the transverse end member 16 or 18 (shown as 16), without the end cap 20. The transverse end member 16 has an upper surface 26 which includes indentures 134 and 135 receiving the interlocking grid 124, specifically the cross members 126 and 128, of the end cap 20 shown in FIG. 9A. The indentures 134 include inner locking barbs 136 for maintaining the cross members 126 in position once they are snapped in. The transverse end member 16 also includes a continuous outer locking rib 138 for engaging and maintaining the peripheral retaining protrusion 122 of the sleeve 20 (FIG. 9A) once it is snapped into place. This design facilitates easy insertion and replacement of end cap 20 without requiring adhesives or fasteners.

As with previously described embodiments of the dolly 10, FIG. 10 illustrates longitudinally extending parabolic ribs 86 on the longitudinal side members 12 and 14, transversely extending parabolic ribs 98 in the transverse end members 16 and 18, and caster bosses 33 mounted to a bottom of the dolly 10 for mounting the caster wheel assemblies 28, 30, 32 and 34. FIG. 11 further illustrates a male component of a tongue and mortise interlock 140 for joining the transverse end member 16 or 18 with a longitudinal side member 12 or 14, which can provide a perfectly square alignment. The transverse end member 16 or 18 is placed on top of the longitudinal side member 12 or 14 and mates with a rectangular female component 151 in the longitudinal side member 12 or 14, seen from the bottom in FIGS. 14 and 15. FIG. 13 illustrates a bottom view of the same transverse end member 16. As shown, the transversely extending parabolic ribs 98 are intersected by criss-crossing ribs 99 along the length of the transverse end member. Fastener openings 160, 162, 164 and 166 align with corresponding fastener openings on longitudinal side members 12 and 14 and can receive fasteners for firmly securing the transverse end members and longitudinal side members together.

Figure 14:
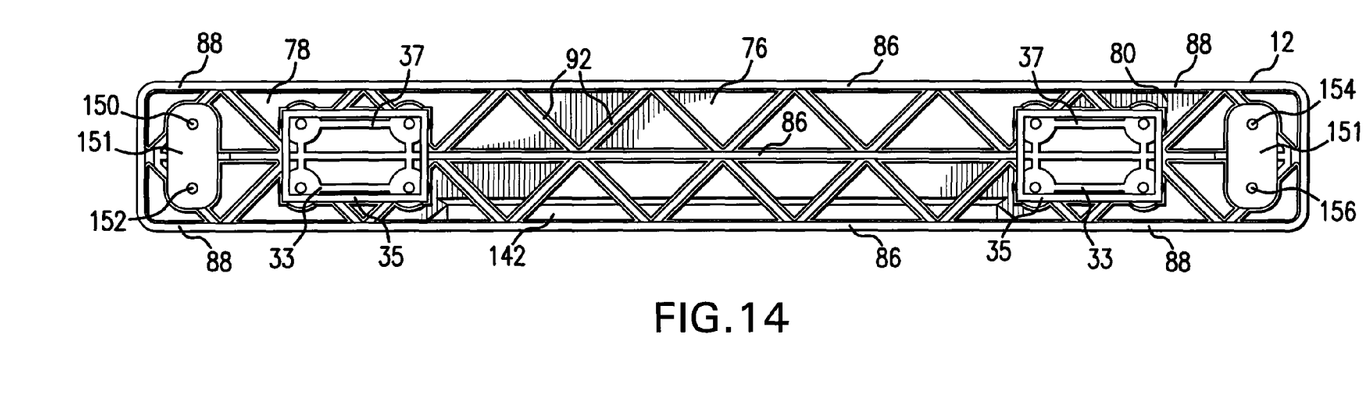
FIGS. 14 and 15 are bottom views of two alternative longitudinal side members useful in the dolly of FIG. 10.
Figure 15:
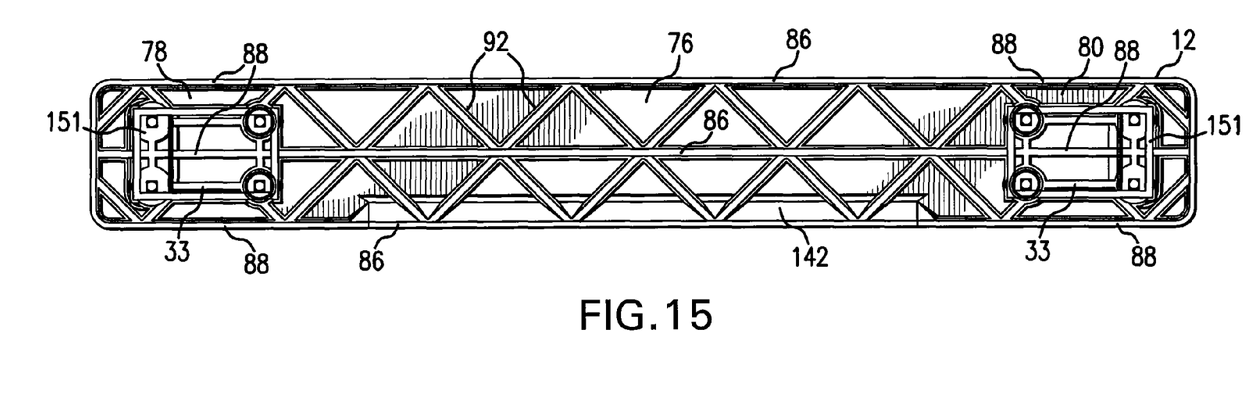

FIGS. 14 and 15 are bottom views of two alternative embodiments of longitudinal side member 12 (or 14), both of which are useful in the dolly 10 shown in FIG. 10, and which are compatible with the transverse end members 16 and 18 shown in FIGS. 11-13. Each of the longitudinal side members shown in these drawings has three longitudinally extending parabolic ribs 86 in the center portion 76. The parabolic ribs 86 are contiguous with three longitudinally extending non-parabolic ribs 88 in each of the end portions 78 and 80. Each longitudinal side member has a plurality of criss-crossing diagonally extending ribs 92 in both the central portion 76 and the end portions 78 and 80 of the longitudinal side member.

FIG. 14 illustrates what is typically a longer longitudinal side member 12 (or 14) in which the caster bosses 33 are longitudinally inward from the fastener openings 150, 152, 154 and 156 in female interlock components 151, used to fasten the longitudinal side member to the transverse end members 16 and 18. FIG. 15 illustrates what is typically a shorter longitudinal side member 12 (or 14) in which the caster bosses 33 overlap and coincide with the fastener openings 150, 152, 154 and 156. The illustrated caster bosses 33 have an outer rim 35 defining an inner recessed portion 37. The mounting plate (not shown) of each caster wheel fits inside the recessed portion 37 and the rim 35 thus prevents sliding and slippage of the mounting plate. FIGS. 14 and 15 also illustrate the underside of an ergonomic hand grip 142 that can be used for lifting and carrying the dolly 10.

Figure 16:
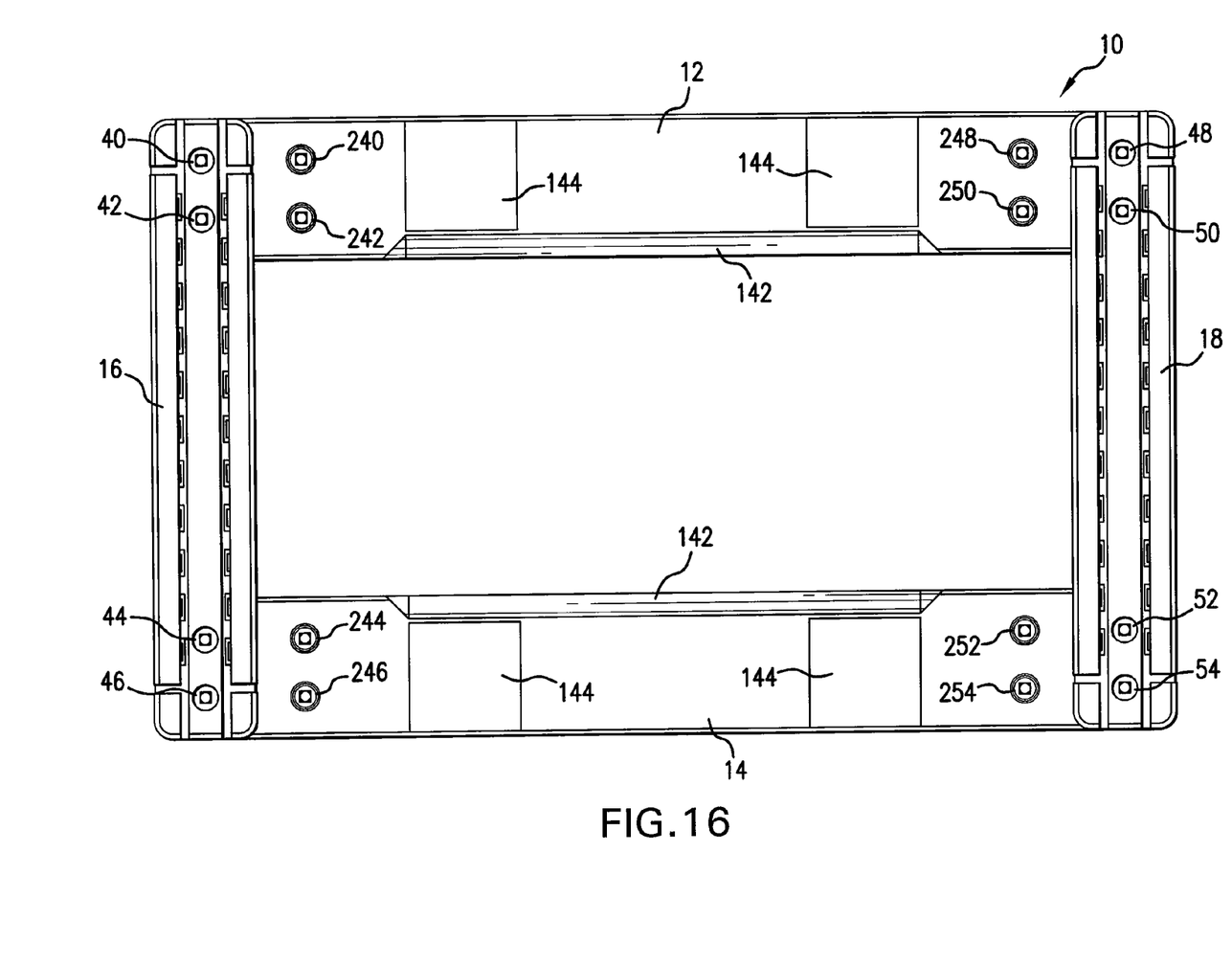
FIGS. 16 and 17 are top plan views of two embodiments of the dolly of FIG. 10.
Figure 17:
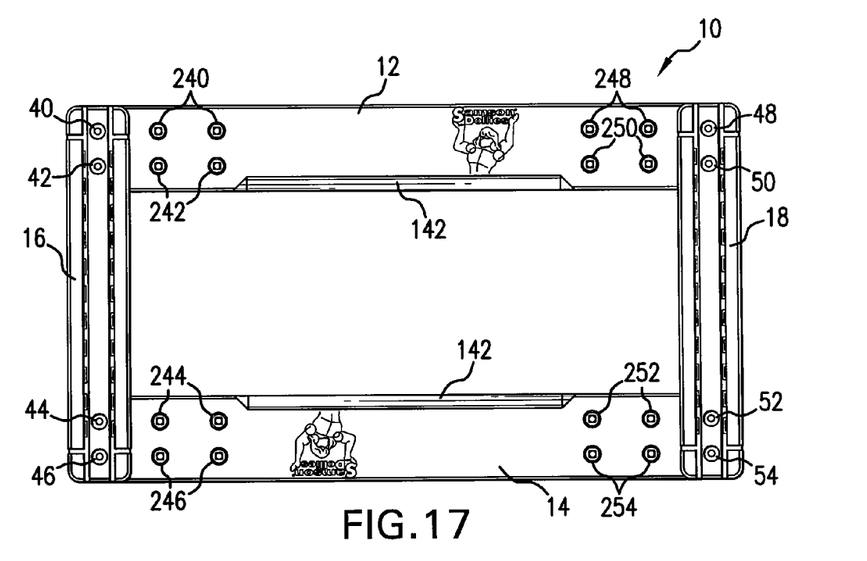

FIG. 16 is a top plan view of the dolly 10 of FIG. 10, without the end caps 20 and 22, and illustrates the positioning of the longitudinal side members 12 and 14 of FIG. 15 and transverse end members 16 and 18. The end portions of longitudinal side members 12 and 14 fit underneath the respective end portions of transverse end members 16 and 18 and are connected using fasteners 40, 42, 44, 46, 48, 50, 52 and 54, which can be nuts and bolts inserted through corresponding fastener openings. In the embodiment shown, the caster bosses are affixed underneath longitudinal side members 12 and 14 using fasteners 40, 240, 42, 242, 44, 244, 46, 246, 48, 248, 50, 250, 52, 252, 54, and 254. Boxes 144 can be used for labels or legends identifying the dolly 10. FIG. 17 is a similar top plan view of dolly 10 except that is uses the longitudinal side members 12 and 14 shown in FIG. 14.

Figure 18:
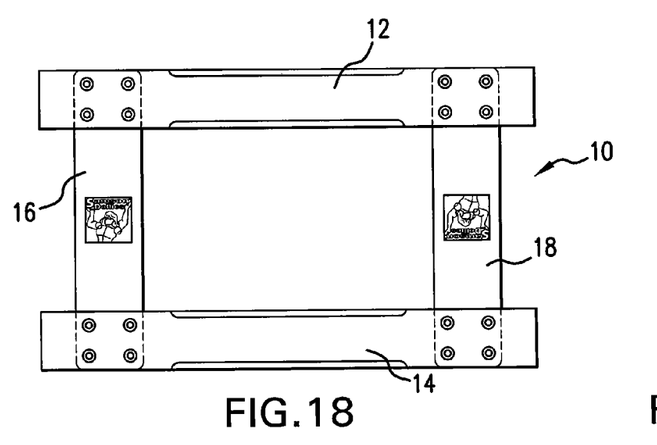
FIG. 18 is a top plan view of another embodiment of the dolly which has an "H" configuration.
Figure 19:
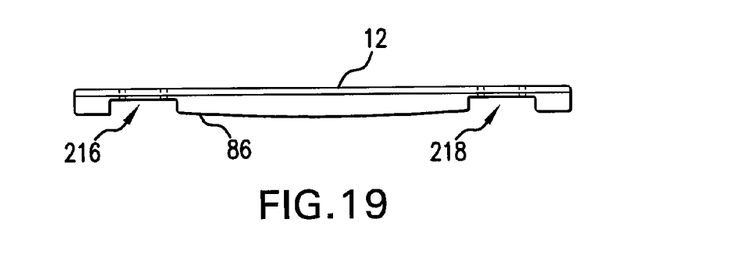
FIG. 19 is a front view of a longitudinal side member used in the dolly of FIG. 18.
Figure 20:
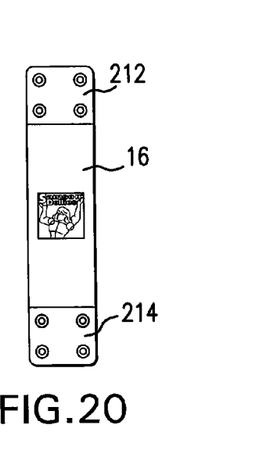
FIG. 20 is a top view of a transverse end member used in the dolly of FIG. 18.

FIG. 18 is a top plan view of still another embodiment of dolly 10 which has an "H" configuration in which the transverse end members 16 and 18 are positioned longitudinally inward from the ends of longitudinal side members 12 and 14. The inward positioning of transverse end members 16 and 18 improves the overall load bearing capacity of the dolly 10 by transferring some of the load away from the centers of longitudinal side members 12 and 14. As shown in FIG. 19, the longitudinal side members 12 and 14 have recessed areas 216 and 218 for receiving the respective transverse end members 16 and 18 and providing a secure, square fit. As shown in FIG. 20, the transverse end members 16 and 18 also have recessed portions 212 and 214 for engaging the recessed portions 216 and 218 of longitudinal side members 12 and 14 to form mortised joints. In the embodiment of dolly 10 shown in FIG. 18, unlike some of the other embodiments, the longitudinal side members 12 and 14 overlap, and are positioned on top of, the transverse end members 16 and 18.

Figure 21:
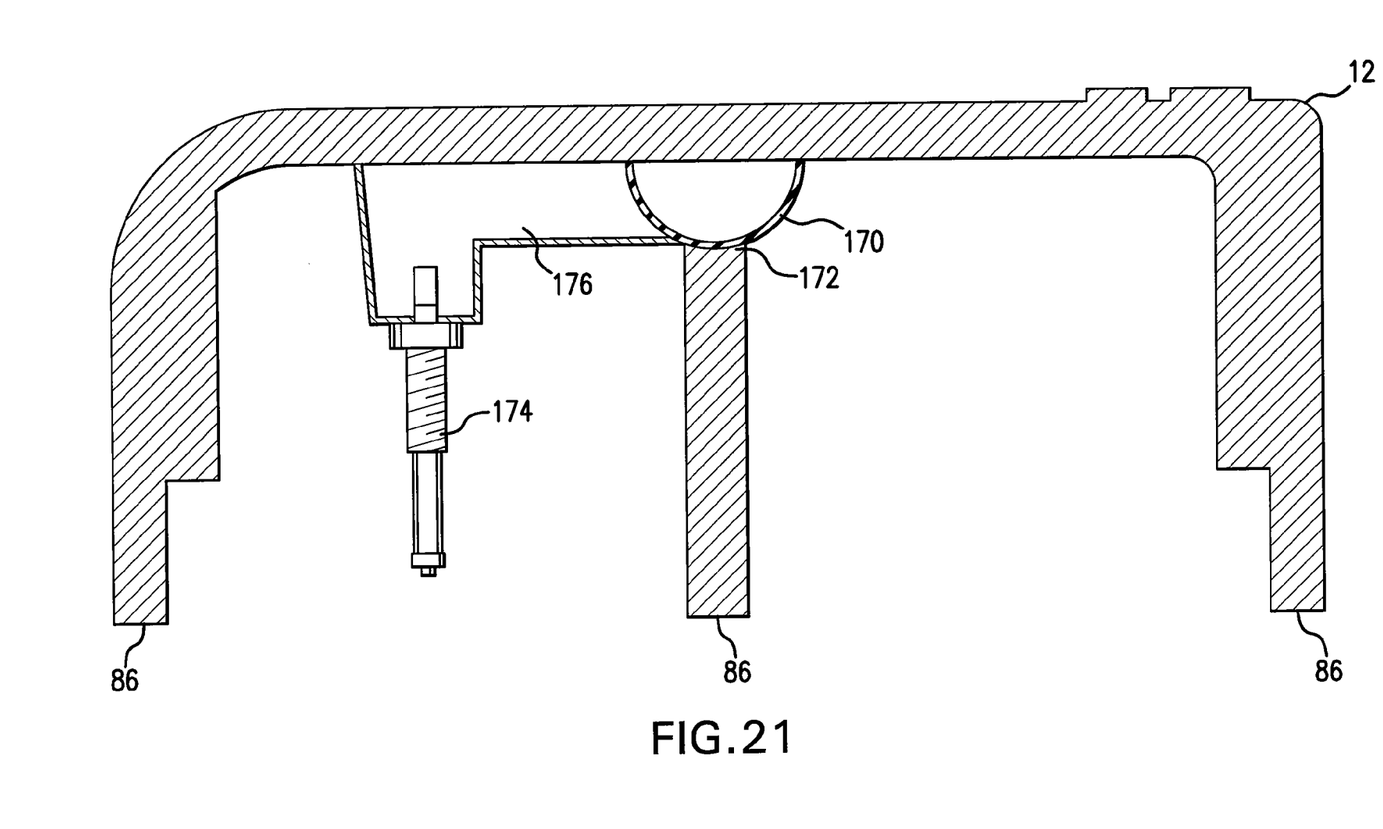
FIG. 21 is a sectional view of another embodiment of a longitudinal side member useful in the dolly of the invention.

FIG. 21 is a sectional view of another embodiment of a longitudinal side member 12 or 14 in which an air chamber 170 is provided at the upper base end 172 of one or more of the parabolic ribs 86. In the embodiment shown, the air chamber is provided at the base of the central parabolic rib. The air chamber 170 can extend along all or a substantial portion of the length of the rib 86. Air can be supplied to the air chamber 170 using an injector nozzle 174 that injects air into a sub-channel 176 in communication with the air chamber 170. The air chamber 170 suitably has a semi-circular or semi-oval shape and adds structural integrity to the dolly 10 when filled with air.

The high strength plastic furniture dolly of the invention can be used to move a wide variety of heavy items, including heavy furniture. The dolly is lightweight, relatively inexpensive to make, and ecologically friendly. Individual parts of the dolly can be replaced without replacing the entire dolly.

The embodiments of the invention described herein are exemplary. Various modifications and improvements can be made without departing from the spirit and scope of the invention. The scope of the invention is indicated by the appended claims, and all changes that fall within the meaning and range of equivalents are intended to be embraced therein.

The invention claimed is:

1. A furniture dolly, comprising:
two longitudinal side members and two transverse end members coupled together to form a rectangular frame, the longitudinal side members having a length that is greater than a length of the transverse end members;
the longitudinal side members and transverse end members being devoid of metal and wood reinforcing elements;
each longitudinal side member including a center portion, first and second end portions, an upper facing and a lower facing;
the center portion of each longitudinal side member including a plurality of longitudinally extending parabolic ribs that protrude downward from the lower surface, and a plurality of transversely or diagonally extending ribs that intersect the parabolic ribs;

each end portion of each longitudinal side member including a plurality of longitudinally extending non-parabolic ribs that protrude downward from the lower surface, and one or more transversely extending ribs that intersect the longitudinally extending ribs;

each transverse end member including an upper facing, a lower facing, a plurality of transversely extending ribs, and one or more longitudinally extending ribs that intersect the transversely extending ribs; and a plurality of caster wheel assemblies mounted to the dolly.

2. The furniture dolly of claim 1, wherein the center portion of each longitudinal side member includes at least three of the longitudinally extending parabolic ribs and at least two of the intersecting ribs.

3. The furniture dolly of claim 2, wherein the intersecting ribs in the center portion comprise diagonally extending ribs.

4. The furniture dolly of claim 2, wherein the intersecting ribs in the center portion comprise both transversely extending ribs and diagonally extending ribs.

5. The furniture dolly of claim 1, wherein each transverse end member includes at least three of the transversely extending ribs.

6. The furniture dolly of claim 5, wherein the transversely extending ribs in each end member are parabolic.

7. The furniture dolly of claim 1, wherein the caster wheel assemblies are mounted to the lower facings of the longitudinal side members at locations longitudinally inward from the transverse end members.

8. The furniture dolly of claim 1, wherein the longitudinal side members and transverse end members are joined together using lap joints or tongue and mortise joints.

9. The furniture dolly of claim 1, further comprising caps mounted to the upper surfaces of at least one of the longitudinal side members and the transverse end members.

10. A furniture dolly, comprising:
two longitudinal side members and two transverse end members coupled together to form a rectangular frame, the longitudinal side members having a length that is greater than a length of the transverse end members;
the longitudinal side members and transverse end members being formed of a fiberglass/polyolefin resin composite;
each longitudinal side member including a center portion, first and second end portions, an upper facing and a lower facing;
the center portion of each longitudinal side member including at least three longitudinally extending parabolic ribs and a plurality of transversely or diagonally extending ribs that intersect the parabolic ribs;
each end portion of each longitudinal side member including a plurality of longitudinally extending non-parabolic ribs that protrude downward from the lower facing;
each transverse end member including an upper facing, a lower facing, a plurality of transversely extending parabolic ribs and one or more ribs that intersect the transversely extending parabolic ribs; and
a plurality of caster wheel assemblies mounted to the dolly.

11. The furniture dolly of claim 10, wherein the intersecting ribs in the center portion comprise diagonally extending ribs.

12. The furniture dolly of claim 10, wherein the intersecting ribs in the center portion comprise transversely extending ribs.

13. The furniture dolly of claim 10, wherein each transverse end member includes a least three of the transversely extending parabolic ribs.

14. The furniture dolly of claim 10, wherein the caster wheel assemblies are mounted to the lower facings of the longitudinal side members at locations longitudinally inward from the transverse end members.

15. The furniture dolly of claim 10, further comprising rubber end caps mounted to the upper facings of the transverse end members.

16. The furniture dolly of claim 10, wherein the polyolefin comprises polypropylene.

17. A furniture dolly, comprising:
two longitudinal side members and two transverse end members joined together with lap joints, the longitudinal side members having a length that is greater than a length of the transverse end members;
the longitudinal side members and transverse end members having a uniform composition and being devoid of reinforcing elements;
each longitudinal side member including a plurality of parabolic longitudinally extending ribs in a center portion of the side member and a plurality of non-parabolic longitudinally extending ribs in first and second end portions of the side member, the parabolic ribs in the center portion being contiguous with the non-parabolic ribs in the first and second end portions;
each transverse end member including a plurality of transversely extending ribs; and
a plurality of caster wheels mounted to the dolly.

18. The furniture dolly of claim 17, wherein each longitudinal side member includes at least four of the parabolic ribs in its center portion and at least four non-parabolic ribs in each of its end portions.

19. The furniture dolly of claim 17, wherein each transverse end member includes at least four of the transversely extending ribs and the transversely extending ribs are parabolic.

20. The furniture dolly of claim 17, wherein the caster wheels are mounted to the dolly longitudinally inward from the transverse end members.

* * * * *